N. B. LIVINGSTON.
Churn.
No. 9,097.
Patented July 6, 1852.
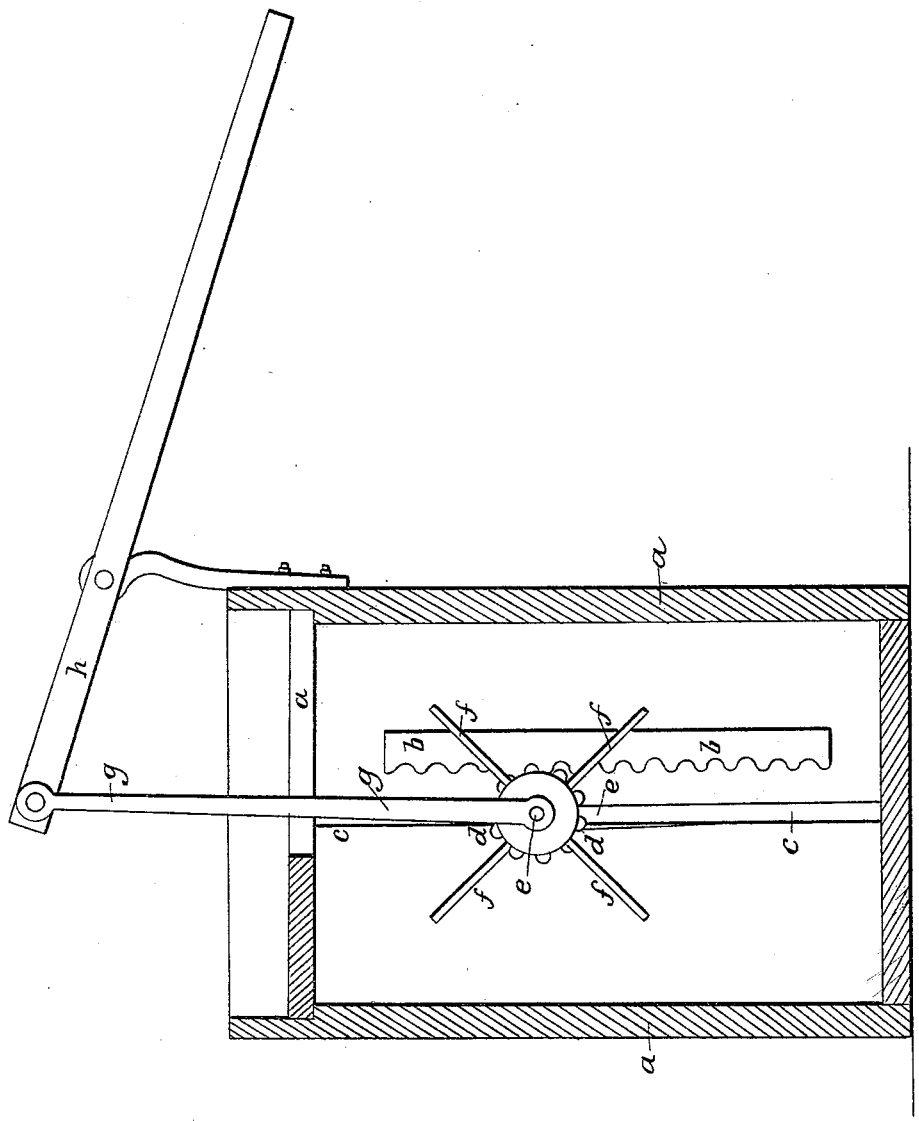

UNITED STATES PATENT OFFICE.

NORMAN B. LIVINGSTON, OF PORTLAND, INDIANA.

CHURN.

Specification of Letters Patent No. 9,097, dated July 6, 1852.

*To all whom it may concern:*

Be it known that I, NORMAN B. LIVINGSTON, of Portland, in the county of Fountain and State of Indiana, have invented new and useful Improvements in Churns; and I do hereby declare the following to be a full, clear, and exact description thereof, reference being had to the annexed drawing, making part of this specification.

The object of my invention is to produce a combined vertical rotating and reciprocal motion, in a deep box or tub as herein below explained.

In the annexed drawing (being a vertical section) of my improvement, (*a*) is the box or tub to receive the cream. A vertical rack (*b*) and groove (*c*) on each of two opposite sides of the box, receive pinions (*d*) on the two ends of a shaft (*e*) from which project wings or beaters (*f*).

(*g*) is a rod which being at its lower end pivoted to the shaft (*e*) about its midlength, and being at its upper end pivoted to a handle (*h*), the motion of the handle up and down, causes the shaft (*e*) and beaters (*f*), to ascend and descend in the groove (*c*), and the pinions (*d*) working at the same time in the racks (*b*), the beaters are thereby caused to revolve in one direction when going up and in the opposite direction when going down, so that both the vertical and the rotary movements, are reversed at every stroke. Thus owing to the compound and shifting nature of the movement, the milk or cream has its course perpetually changed and shifted. This arrangement admits of a deep narrow box, which is desirable both on account of the greater stability and resistance of the cream which also by being kept in a solid body, makes good solid yellow butter, but I have observed that not only is this the case, but if on the other hand, butter be made in shallow vessels much exposed to the air—although it may be more quickly formed it is comparatively soft and white. This churn is also free from the objection urged against some that the action is mainly applied to the lower part of the liquid away from the cream as every part is subjected to the action of the beaters.

Having thus fully described the nature of my improvement in churns, what I claim therein as new and desire to secure by Letters Patent is—

The racks (*b*) grooves (*c*) and pinions (*d*), by which the shaft (*e*) and beaters (*f*) are caused to traverse the milk or cream with a compound vertical revolving and reciprocating motion, after the manner and for the purposes described.

In testimony whereof, I have hereunto set my hand before two subscribing witnesses.

NORMAN B. LIVINGSTON.

Witnesses:
EDWARD H. KNIGHT,
O. H. PUGH.